United States Patent
Barton et al.

(10) Patent No.: US 11,677,859 B2
(45) Date of Patent: Jun. 13, 2023

(54) FEDERATED SERVICE REGISTRIES FOR ACCESS PROVIDERS

(71) Applicant: Cisco Technology, Inc., San Jose, CA (US)

(72) Inventors: Robert E. Barton, Richmond (CA); Jerome Henry, Pittsboro, NC (US); Vinay Saini, Bengaluru (IN); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 17/445,159

(22) Filed: Aug. 16, 2021

(65) Prior Publication Data

US 2023/0051134 A1 Feb. 16, 2023

(51) Int. Cl.
*G06F 15/16* (2006.01)
*H04L 67/60* (2022.01)
*H04L 12/46* (2006.01)

(52) U.S. Cl.
CPC .......... *H04L 67/60* (2022.05); *H04L 12/4633* (2013.01)

(58) Field of Classification Search
USPC .................................................. 709/217, 227
See application file for complete search history.

(56) References Cited

U.S. PATENT DOCUMENTS

| | | | | |
|---|---|---|---|---|
| 8,578,076 B2* | 11/2013 | van der Linden | .. | H04L 67/1097 709/227 |
| 9,098,314 B2* | 8/2015 | Blank | ............... | G06F 40/103 |
| 2003/0005128 A1* | 1/2003 | Hickman | ................ | G06F 9/451 709/227 |
| 2010/0010899 A1* | 1/2010 | Lambert | ................ | G06Q 30/02 705/14.58 |
| 2012/0246468 A1* | 9/2012 | Gabor | ................ | H04W 12/069 713/156 |
| 2012/0331528 A1* | 12/2012 | Fu | ........................... | H04L 67/10 726/4 |
| 2014/0112325 A1 | 4/2014 | Calcev et al. | | |
| 2016/0006610 A1* | 1/2016 | Brandwine | ............. | H04L 45/02 709/218 |

(Continued)

FOREIGN PATENT DOCUMENTS

KR 20220083837 A * 6/2022

OTHER PUBLICATIONS

Bascuñana Muñoz, Alejandro, and Tomás Robles Valladares. "Remote service invocation through heterogeneous networks using open environments." In International Workshop on IP Operations and Management, pp. 39-48. Springer, Berlin, Heidelberg, 2005. (Year: 2005).*

(Continued)

*Primary Examiner* — Richard G Keehn
(74) *Attorney, Agent, or Firm* — Patterson + Sheridan, LLP

(57) ABSTRACT

Techniques for federated service registries are provided. A first access server determines a first plurality of services available within a local network associated with the first access server, as well as a second plurality of services available at one or more remote networks. A request for a first service is received from a client device, where the first service is not included in the first plurality of services and is included in the second plurality of services. A tunnel is established from the client device to one or more remote networks.

20 Claims, 9 Drawing Sheets

(56) References Cited

U.S. PATENT DOCUMENTS

| | | |
|---|---|---|
| 2016/0183168 A1 | 6/2016 | Horn et al. |
| 2018/0007619 A1* | 1/2018 | Zhuang .................. H04L 67/51 |
| 2018/0042058 A1 | 2/2018 | McCann et al. |
| 2018/0060588 A1* | 3/2018 | Shaposhnik ............ G06F 21/57 |
| 2020/0136892 A1* | 4/2020 | Rao ....................... H04L 41/069 |
| 2020/0220938 A1 | 7/2020 | McCann et al. |

OTHER PUBLICATIONS

"Wireless Service Discovery is Easy with IEEE 802.11aq," [Accessed Online Aug. 6, 2021] 2 pages <https://www.businesswire.com/news/home/20180919005049/en/Wireless-Service-Discovery-is-Easy-with-IEEE-802.11aq%E2%84%A2>.

"What is IEEE 802.11aq?," [Accessed Online Aug. 9, 2021 https://www.everythingrf.com/community/what-is-ieee-802-11aq].

Electronic Design, "Simplified Wi-Fi Service Discovery,"Feb. 21, 2019, 9 pages.

* cited by examiner

FEDERATED SERVICE REGISTRIES FOR ACCESS PROVIDERS

TECHNICAL FIELD

Embodiments presented in this disclosure generally relate to computing services. More specifically, embodiments disclosed herein relate to using federated registries to provide access to remote services.

BACKGROUND

Some network devices, such as access points (APs), are able to provide a variety of computing services to associated clients. These services may generally be rendered directly (e.g., performed by the AP), or provided by local servers or components within the local network. For example, the services may include data analytics, security and encryption services, messaging services, and the like. Additionally, such services may extend beyond purely computational tasks, including printing services (if a printer is available), access to media devices (such as video cameras, speakers, and displays), and the like.

Some conventional systems allow users to identify services that are available prior to connecting to the network. For example the IEEE 802.11aq amendment allows clients to quickly determine which services are available in the wireless local area network (WLAN), prior to actually connecting to the WLAN. This may be referred to as Pre-Association Discovery (PAD). These pre-association queries can facilitate a rich exchange of information between the AP and the client device, allowing users to discover what types of services are supported before making the decision to connect.

In the conventional 11aq architecture, an access network query protocol (ANQP) server connects to a Service Information Registry (SIR) which has a record of available services in the local network. The AP can query the ANQP server and/or the SIR as a proxy server to determine the service capability of the network. In this way, client devices can be informed as to which services are available.

However, conventional systems assume a static list of services, and are limited to services that are locally available in the local network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
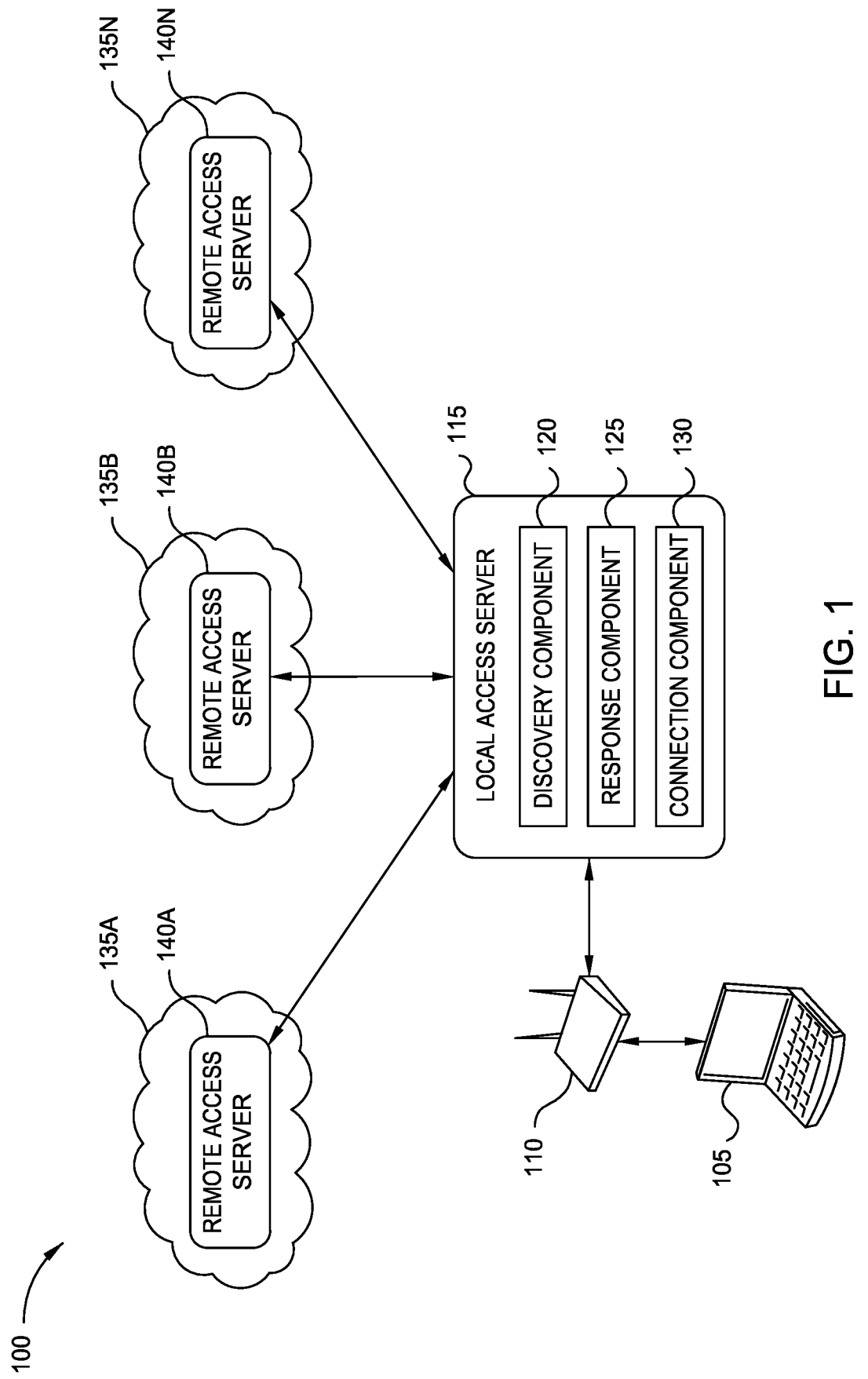
FIG. 1 depicts an example system to provide a federated service registry, according to some embodiments disclosed herein.

According to one embodiment presented in this disclosure, a method is provided. The method includes determining, by a first access server, a first plurality of services available within a local network associated with the first access server; determining, by the first access server, a second plurality of services available at one or more remote networks; receiving, from a client device, a request for a first service, wherein the first service is not included in the first plurality of services and is included in the second plurality of services; and establishing a tunnel from the client device to one or more remote networks.

According to a second embodiment of the present disclosure, a computer product is provided. The computer product comprises logic encoded in a non-transitory medium, the logic executable by operation of one or more computer processors to perform an operation comprising: determining, by a first access server, a first plurality of services available within a local network associated with the first access server; determining, by the first access server, a second plurality of services available at one or more remote networks; receiving, from a client device, a request for a first service, wherein the first service is not included in the first plurality of services and is included in the second plurality of services; and establishing a tunnel from the client device to one or more remote networks.

According to a third embodiment of the present disclosure, a system is provided. The system comprises one or more computer processors; and logic encoded in a non-transitory medium, the logic executable by operation of the one or more computer processors to perform an operation comprising: determining, by a first access server, a first plurality of services available within a local network associated with the first access server; determining, by the first access server, a second plurality of services available at one or more remote networks; receiving, from a client device, a request for a first service, wherein the first service is not included in the first plurality of services and is included in the second plurality of services; and establishing a tunnel from the client device to one or more remote networks.

EXAMPLE EMBODIMENTS

Embodiments of the present disclosure provide federated service registries that enable remote services (e.g., those available on one or more remote networks or in a cloud deployment) to be provided to local client devices seamlessly.

In some embodiments, a local service registry (e.g., a SIR in an ANQP-based system) can act as part of a larger federation that offers external services. For example, various platforms may offer cloud-based capabilities that can include a large catalogue of wireless client services which may be shared with other members of the federation. In some embodiments of the present disclosure, these other domains (and their services) can be treated as a set of external ANQP domains with virtual (on demand) SIRs. This can allow a local access network provider (ANP) to subscribe to a federated domain, significantly increasing the available services.

In some embodiments, the federation of domains allow services listed in partner servers (e.g., remote servers) to be advertised in local networks. This allows access network providers to leverage such remote services if requested by a client. For example, the remote servers may share available service catalogue information, along with any connection details required if the service will be used, and present this to the local server(s). In some embodiments, each remote domain can group its services into categories, and share this category catalogue with others (rather than identifying every available service explicitly).

In an embodiment, at the time of pre-association, a wireless client can issue a query to the AP, asking which services are reachable or available. In conventional systems, the AP responds with a list of services that are available locally. In aspects of the present disclosure, other (remote) services beyond those which are available in the local wireless network are reachable through the above-discussed federation of external servers. Thus, the AP can also respond indicating these remote services, and/or indicating that other services are available, beyond the locally-available ones. In some embodiments, the AP can also indicate the other service categories that are reachable via the partners. In contrast, conventional systems are strictly limited to truly-local services.

In embodiments, the service announcement can either be broadcast or unicast, and may be unsolicited or on demand. Additionally, in some embodiments, the AP can use a bloom filter to obfuscate the details of the services to unauthorized eavesdropper, in a similar manner to conventional systems.

In some embodiments, if the requested service is available locally in the network, it can be provided directly to the client via the AP. If the service is remote, in some embodiments, a tunnel is established between the client device and the remote service, enabling seamless access to the remote service(s).

FIG. 1 depicts an example system 100 to provide a federated service registry, according to some embodiments disclosed herein. In the illustrated example, a client device 105 is communicatively linked to an AP 110. In some embodiments, this link may include pre-association communications (e.g., as part of service discovery). In other embodiments, the link may correspond to an ordinary connection or association to the AP 110.

The AP 110 can generally provide connectivity as an access network provider to a local network (e.g., a WiFi network). In some embodiments, the local network may be communicatively coupled with one or more remote networks, such as the Internet.

As illustrated, the local network includes a local access server 115. In some embodiments, the local access server 115 is an ANQP server. Further, the illustrated system 100 includes a set of remote networks 135A-N (e.g., cloud platforms), each with a corresponding remote access server 140A-N. In some embodiments, the remote access servers 140 functions in a similar manner to the local access server 115. That is, the remote access servers 140 may generally provide various computing services to connected devices within their own local networks, just as the local access server 115 does so within its local network.

In the illustrated example, the local access server 115 includes a discovery component 120, response component 125, and connection component 130. Although depicted as discrete components for conceptual clarity, the operations of the discovery component 120, response component 125, and connection component 130 may be combined or distributed across any number of components in some embodiments. Additionally, though the illustrated example does not depict these components in the remote access servers 140, in some embodiments, each remote access server 140 may include one or more of these components.

In some embodiments, the discovery component 120 identifies services that are available to connected client devices (e.g., client device 105), either locally or remotely. For example, the discovery component 120 may interface with a local SIR (not illustrated) to identify services available in the local network (e.g., services that can be accessed directly within the local network, without requiring data to pass outside of the local network).

In the illustrated embodiment, the discovery component 120 can also communicate with the remote access servers 140A-N to discover which service(s) (or categories of services) are available at each remote access server 140. In one embodiment, the discovery component 120 uses this information to maintain a list of available services, as well as relevant information for each service. This information can include, for example, whether the service is local or remote (and, if remote, where the service is located), details or characteristics of the service, any costs or requirements to use the service, and the like.

In one embodiment, the response component 125 evaluate user requests (e.g., from the client device 105) and generates appropriate responses. For example, if the client device 105 requests a list of all available services, the response component 125 may return the list maintained by the discovery component 120. In some embodiments, if the list is sufficiently small, the response component 125 can return the entire list. That is, the response component 125 can indicate each service explicitly, allowing the user to select among them. In some embodiments, if the number of services exceeds some threshold (e.g., such that the entire list cannot fit in the response frame), the response component 125 can return some subset of the services (e.g., those available locally) and include an indication that other services are available upon request.

In some embodiments, if the client device 105 requests a specific service, the response component 125 can generate a corresponding response indicating, for example, whether the service is available locally, whether the service is only remotely available, service information (such as the cost of the service, if applicable), and the like.

In the illustrated embodiment, the connection component 130 can facilitate or establish connections between the client device 105 and the relevant service(s). For example, if the service is available locally, the connection component 130 may provide the relevant connection information to the client device 105, allowing it to establish a connection to the service (either directly, or via the local network).

In some embodiments, if the selected service is remote (e.g., on one of the remote networks 135), the connection component 130 can establish a tunnel between the client device 105 and the remote service. This can allow the client device 105 to easily use the remote service. In some aspects, the client device 105 can be informed or warned when the service is remote (as opposed to local services). In other embodiments, the client device 105 may be unaware whether the service is local or remote.

The federated service system 100 can therefore enable seamless connectivity of remote services (e.g., in a federated ANQP system), significantly expanding the capabilities available to connected clients on the local network. This can improve the computational capacity of the system (e.g., by offloading some tasks to remote services), provide new services that were previously unavailable in conventional systems, and generally improve the functionality of the network, client devices, and overall system.

FIGS. 2A, 2B, 2C, and 2D depict an example workflow for providing remote services via a federated service registry, according to some embodiments disclosed herein. In the illustrated example, the workflow is performed by the system 100, discussed above with reference to FIG. 1.

Figure 2A:
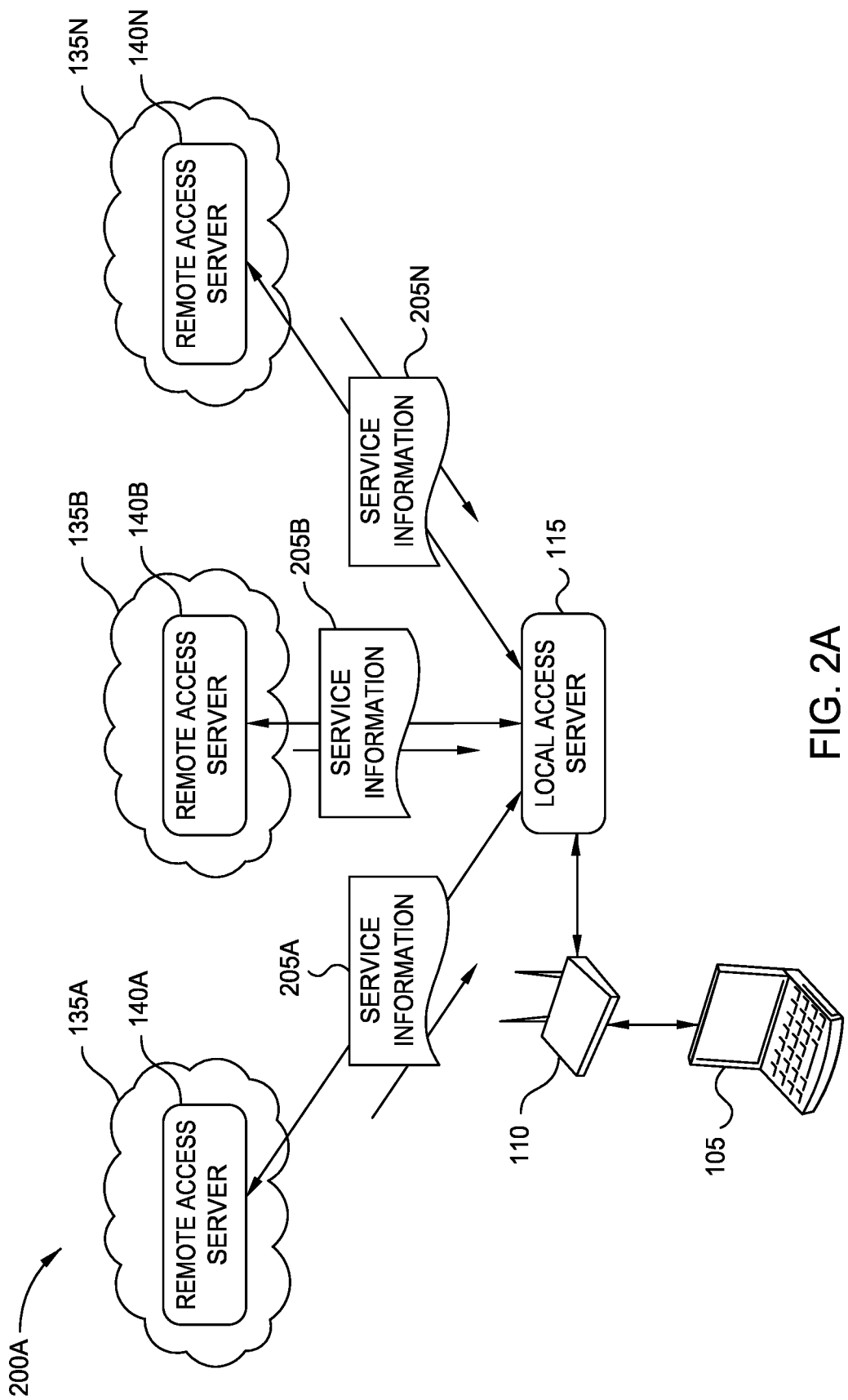
FIGS. 2A, 2B, 2C, and 2D depict an example workflow for providing remote services via a federated service registry, according to some embodiments disclosed herein.

In FIG. 2A, at a step 200A, the remote access servers 140A-N each transmit service information 205A-N to the local access server 115. In one embodiment, this service information 205A-N indicates, for the respective remote access server 140A-N, which services are available. In some embodiments, the service information 205 also indicates any relevant characteristics or requirements, such as the pricing model for using each service, connection details for each service, and the like. Though not included in the illustrated example, in some embodiments, the local access server 115 may similarly transmit service information to one or more remote access servers 140 (e.g., to allow clients of the remote access servers 140 to access the services provided by the local access server).

Additionally, though the illustrated example suggests this collection of service information 205 as an initial step, in some embodiments, some or all of the service information 205 is collected in response to client requests. In one such embodiment, if the client device 105 requests a service that is not currently available (e.g., that the local access server 115 cannot provide locally and it not aware of remotely), the local access server 115 may query one or more remote access servers 140 to determine whether they can perform the service.

In some embodiments, the local access server 115 determines a category or type of the requested service. The local access server 115 can then identify one or more remote access servers 140 that have advertised this category or type (even if individual services within the category have not been listed). In an embodiment, the local access server 115 can then query these remote access server(s) 140 to determine whether they can provide the specific requested service.

As discussed above, the local access server 115 can use the provided service information 205 to maintain a registry of services that are available in the federated system.

Figure 2B:
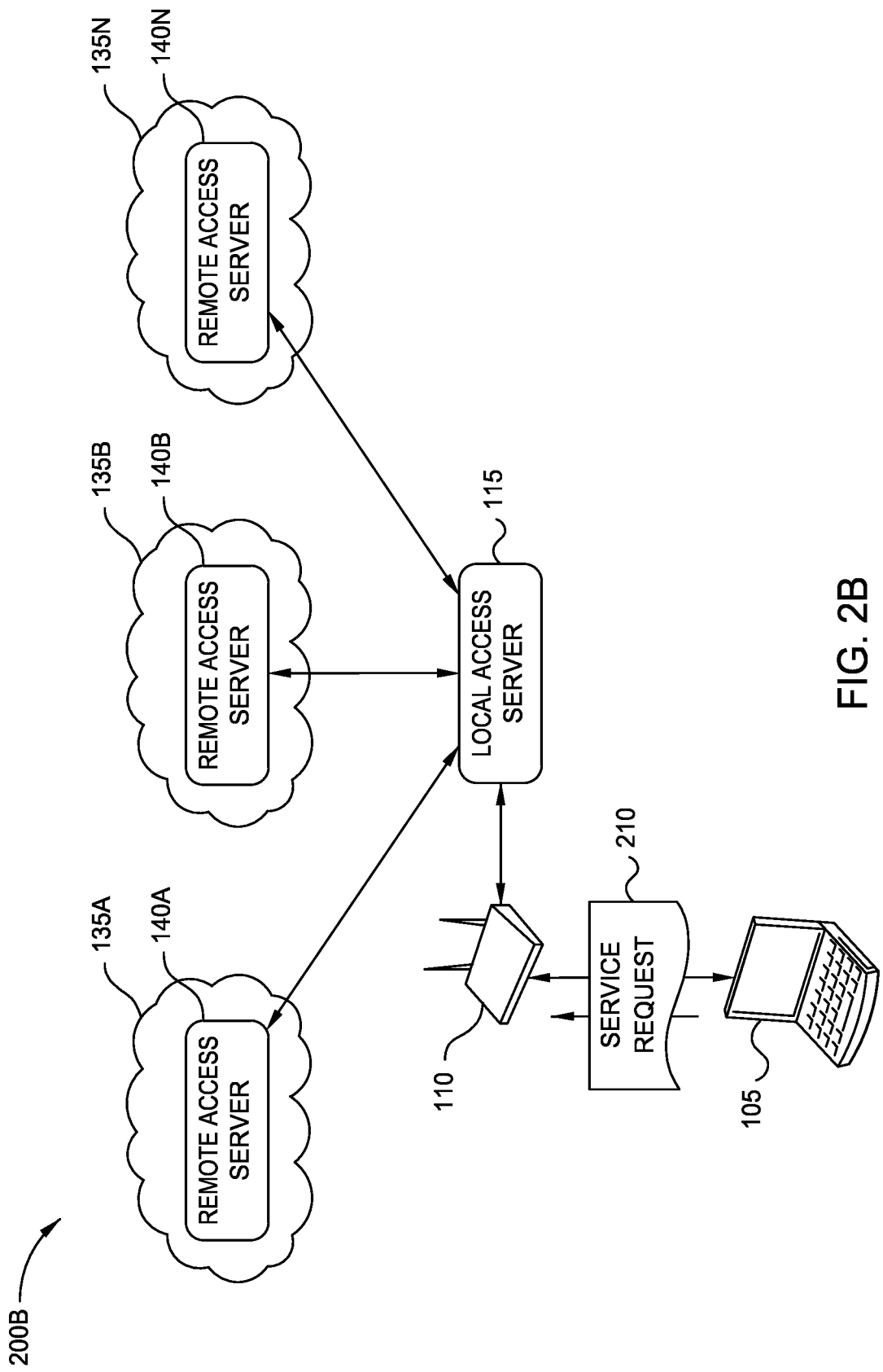

In FIG. 2B, at a step 200B, the client device 105 transmits a service request 210 to the AP 110 (which may be forwarded to the local access server 115). Generally, this service request 210 is used to solicit one or more computational services from the local access server 115. In various embodiments, this service request 210 may include, for example, a request for a list of all available services (locally, remotely, or both), a query for a specific service or category of service, and the like.

Figure 2C:
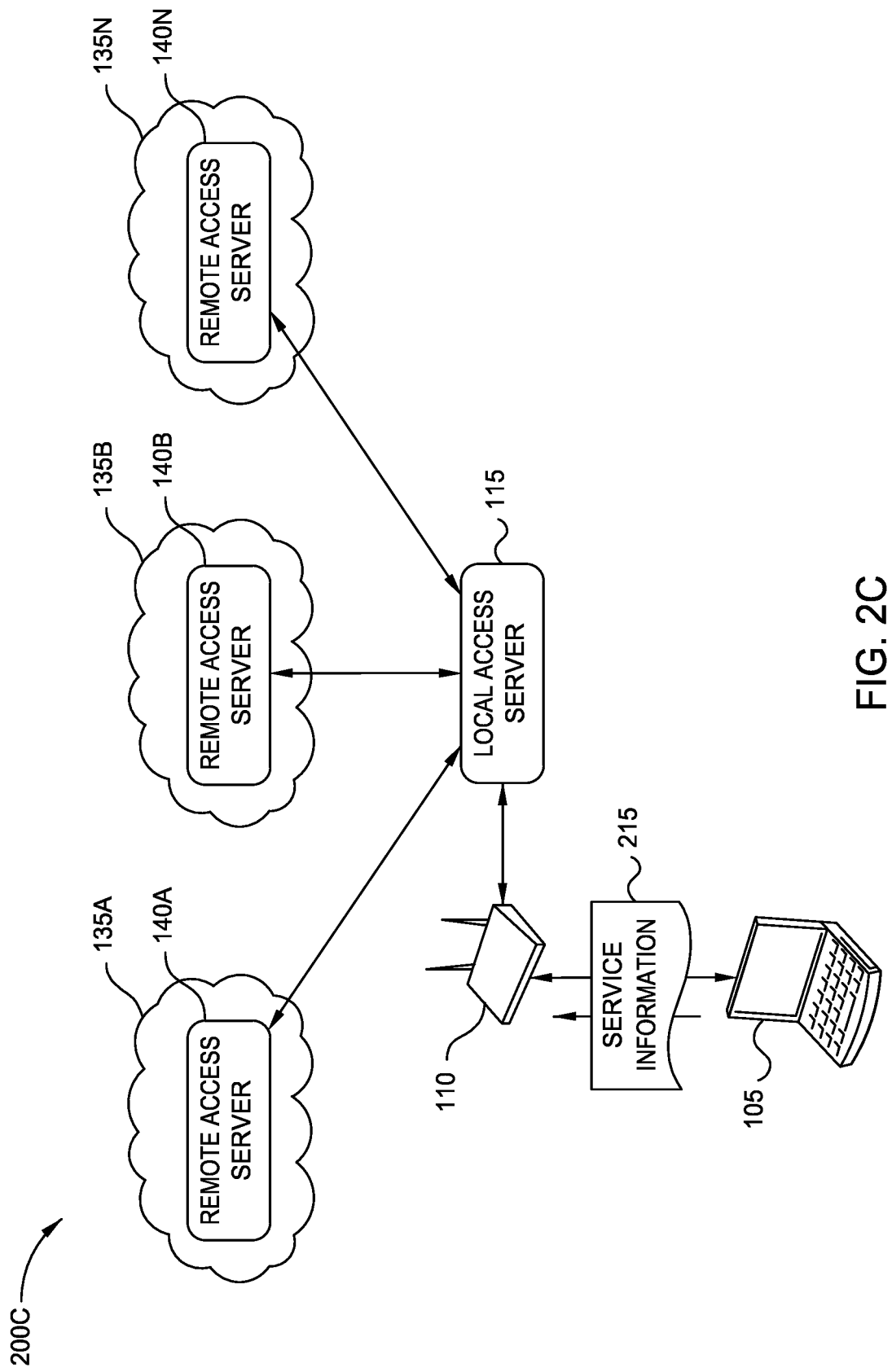

As illustrated in FIG. 2C at step 200C, the local access server 115 can respond with service information 215 based on the service request 210. If the service request 210 was for a list of available services, the service information 215 may generally include indications of one or more available services.

In some embodiments, the service information 215 indicates all available services (or all services that satisfy the query conditions in the service request 210). For example, if the client device 105 requested data analytics services, the service information 215 may include a list of data analytics services that are available, either locally in the network or remote on one or more remote networks 135.

In some embodiments, rather than explicitly identifying all available services, the local access server 115 may indicate some of them explicitly (e.g., particularly identifying the service and/or connection information), while some others are excluded from the service information 215. For example, if the list of services exceeds a threshold number (e.g., more than can fit in the response frame), some of the services may be culled.

In one embodiment, the local access server 115 can explicitly indicate each locally-available service. In one such embodiment, remotely-available services may be excluded from the response, and an indication that further services are available remotely can be included.

Figure 2D:
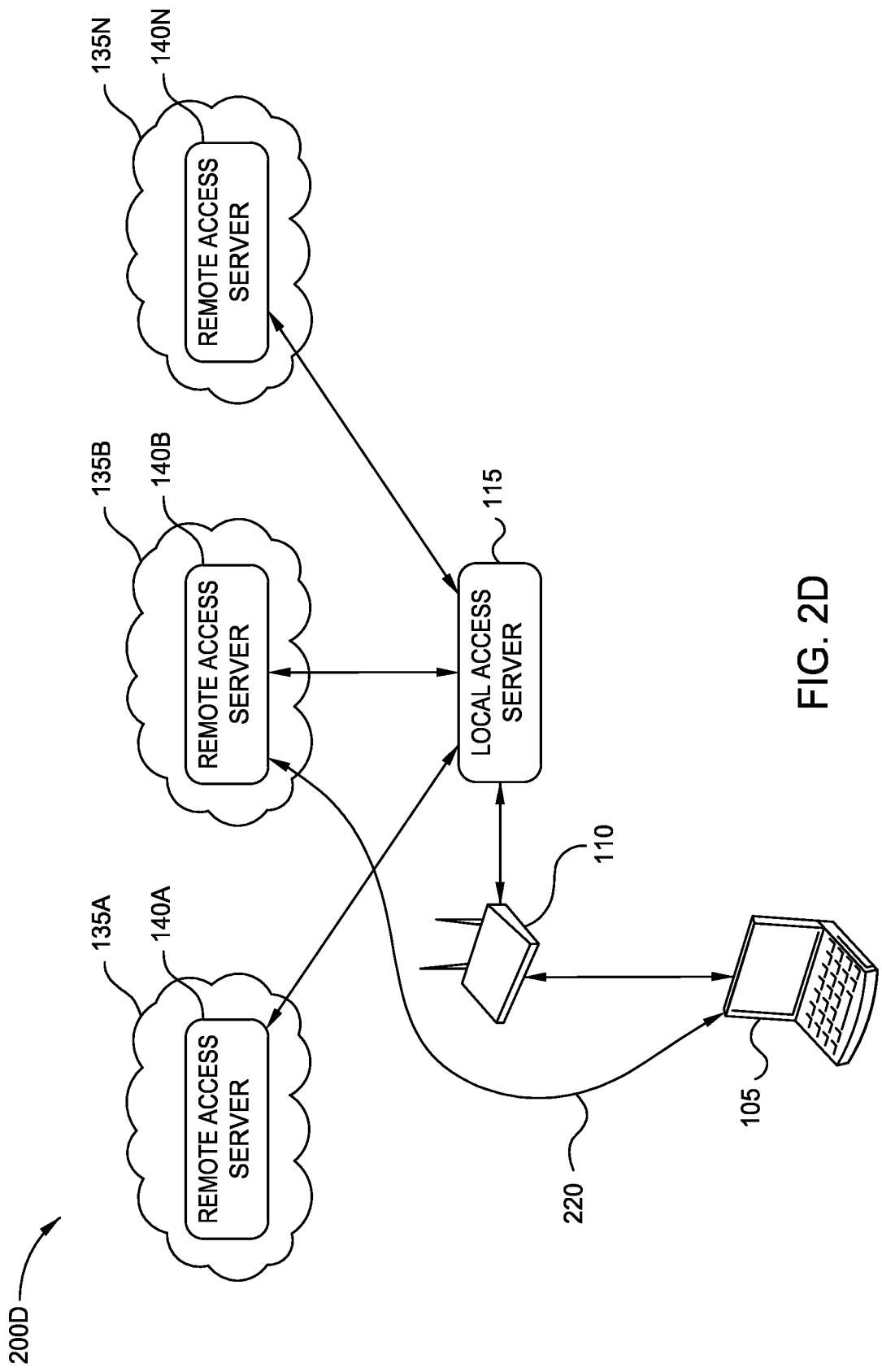

As illustrated in FIG. 2D at step 200D, the client device 105 uses the received service information 215 to connect to the requested service. In the illustrated example, the service is available via remote access server 140B in remote network 135B. In some embodiments, a tunnel 220 is established to connect the client device 105 and the remote access server 140B, allowing the client device 105 to access the remote service seamlessly.

Figure 3:
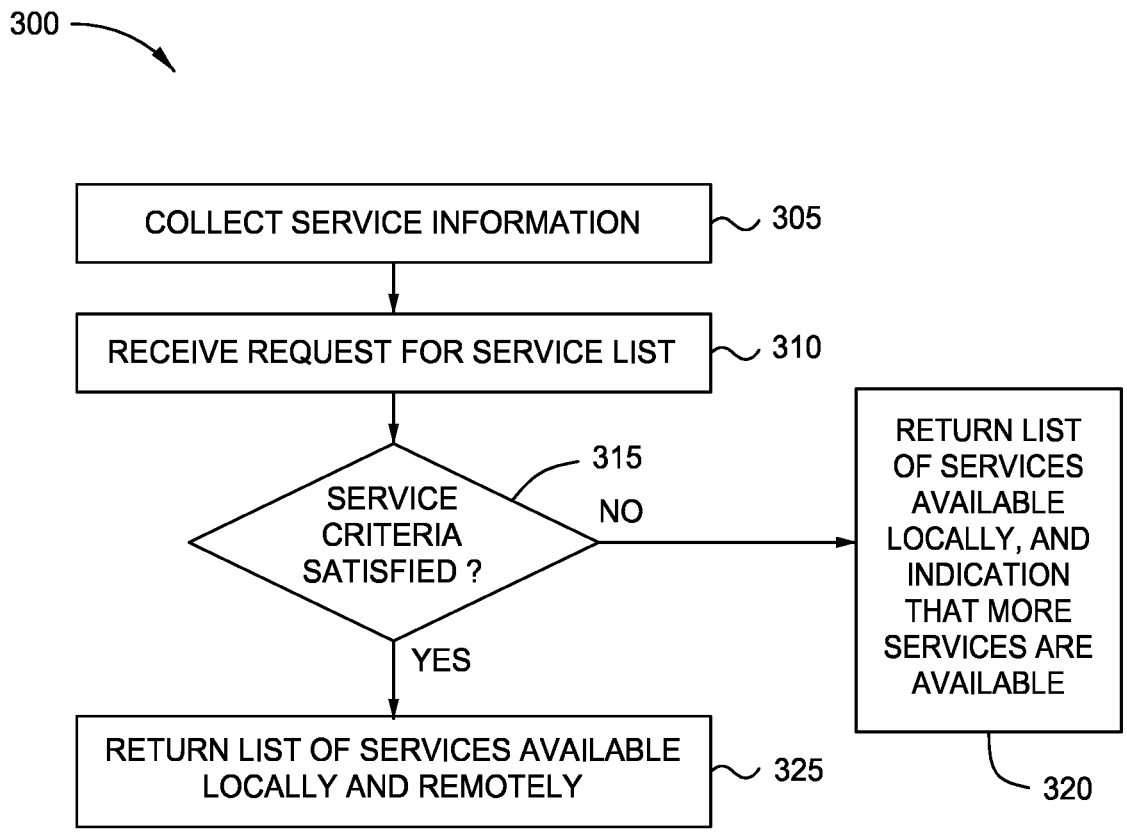
FIG. 3 is a flow diagram for providing remote service information in a federated service registry, according to some embodiments disclosed herein.

FIG. 3 is a flow diagram depicting a method 300 for providing remote service information in a federated service registry, according to some embodiments disclosed herein.

The method 300 begins at block 305, where an access server (e.g., local access server 115 in FIG. 1) collects service information. This may include, for example, step 200A in FIG. 2A. Collecting the service information may include receiving service information from one or more remote access servers (e.g., remote access servers 140 in FIG. 1). In some embodiments, this information is received responsive to a query that is transmitted to the remote servers. Additionally, in an embodiment, collecting the service information can include identifying locally-available services.

In embodiments, the service information generally includes details relating to available services. For example, the service information may indicate, for each service, connection details needed to connect to or use the service, details relating to performance of the service (e.g., latency, priority, costs, and the like), and the like. In some embodiments, the service information may indicate the category or type of each service. In at least one embodiment, service information from remote access servers may indicate which categories or types of services are available, without explicitly listing every service. This can reduce communication overhead in the system.

At block 310, the access server receives, from a client device (e.g., client device 105 in FIG. 1), a request for a list of available services. In some aspects, as discussed above, this request may be included during pre-association discovery, where the client device inquires about the available services before associating to the AP/network. This can allow the client device (or the user of the device) to decide whether or not to associate to the network. For example, if the client needs a particular service, they can first query whether the AP or local access server can provide it. If not, the user may choose to associate to a different network.

In some embodiments, rather than requesting an overall list of available services, the request may indicate one or more specific services. For example, the client device may ask whether a particular service (such as a data analytics service) is available. In at least one embodiment, the client device can specify that the service must be local (thereby excluding remote services). In some embodiments, however, the client device may be unaware whether the service is local or remote.

In some embodiments, the request may include various filtering criteria. For example, the client device may request information on all services within one or more specific categories. Similarly, in some embodiments, the client device may request a list of services that satisfy other criteria, such as a maximum cost or latency.

At block 315, responsive to the request, the local access server determines whether one or more defined service criteria are satisfied. In some embodiments, this evaluating the criteria can include determining whether the requesting client is authorized to access one or more local and/or remote services. For example, in one embodiment, some client devices may only be authorized to use local services (e.g., because they are not subscribed to the federated service system).

In some embodiments, as discussed above, the criteria may include a maximum number of services that can be listed in the response frame. That is, the access server may determine whether the number of services (that satisfy any criteria specified in the request) exceeds this threshold. If the criteria are not satisfied (e.g., because the number of services exceeds the threshold), the method 300 continues to block 320, where the server returns a list of at least some services that are available, as well as an indication that one or more additional services are available on request.

In some embodiments, in the response, the system may prioritize local services by listing them individually while grouping remote services into broader categories (or into a generic indication that more services are available). For example, the server may explicitly indicate each local service, followed by an indication that one or more analytics-related services, as well as one or more machine learning-related services, are available remotely.

In some embodiments, upon receiving this response, the client may return one or more further queries. For example, the client may request additional information on one more of the specified services. Additionally, in some embodiments, the client may request a full listing for one or more of the indicated service categories.

Returning to block 315, if the server determines that the criteria are satisfied (e.g., because the total number of services is less than or equal to the maximum threshold), the method 300 continues to block 325. At block 325, the system returns a response that includes a full list of the available services, including both local and remote services. In some embodiments, as discussed above, the response does not indicate which services are remote. That is, the response may simply indicate the available services, allowing the client to use remote services seamlessly in the same way that local services are used.

Figure 4:
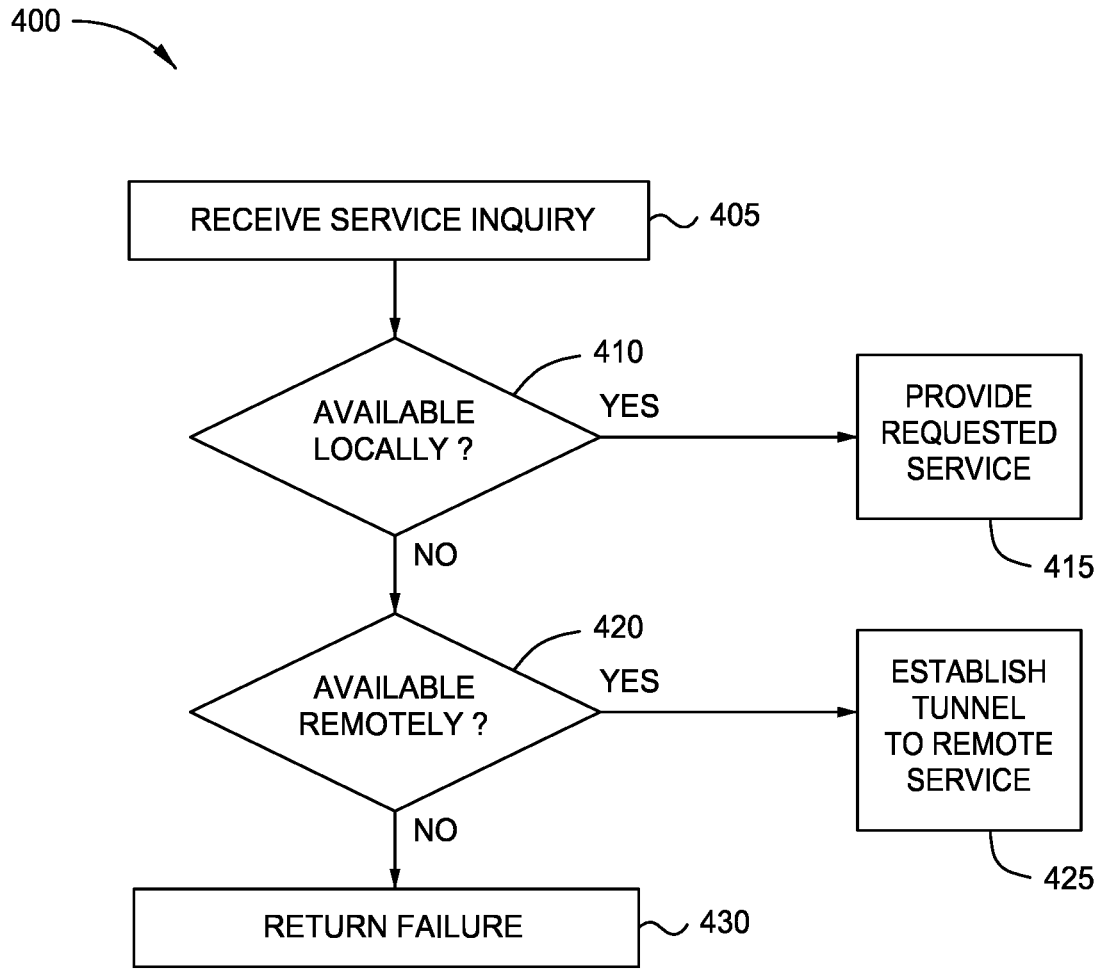
FIG. 4 is a flow diagram for providing local and remote services, according to some embodiments disclosed herein.

FIG. 4 is a flow diagram depicting a method 400 for providing local and remote services, according to some embodiments disclosed herein.

The method 400 begins at block 405, where an access server (e.g., local access server 115 in FIG. 1) receives, from a client device (e.g., client device 105 in FIG. 1), a request for a specific service. That is, the inquiry may request access to or use of a specific computing service (rather than a general inquiry about which services are available).

At block 410, the access server determines whether the service is available locally. That is, the access server can determine whether the service can be provided by one or more devices or components that are also connected to the local network (as opposed to one or more remote networks). If so, the method 400 continues to block 415, where the access server provides the requested service.

In some embodiments, providing the service can include performing the service and returning any relevant results to the client. In another embodiment, providing the service includes transmitting connection details to the client, allowing the client to connect to the service (either directly, or through the local network).

Returning to block 410, if the access server determines that the service is not available within the local network, the method 400 continues to block 420, where the access server determines whether the service is available remotely. For example, as discussed above, the access server may determine whether the service is available as part of a federated service registry. Such a system can allow local clients to use remote services seamlessly.

In some embodiments, determining whether the service is available remotely can include searching a federated service registry that maintains indications of all services available within the federated system. In at least one embodiment, determining whether the service is available remotely can include querying one or more remote servers. For example, if a remote server indicated that a particular category is available (and the requested service is within the category), the access server may query this server to determine whether the specific requested service is available. In some embodiments, if the remote server has explicitly listed a service, the access server can nevertheless query the remote server to confirm that the requested service remains available (e.g., that the information is not stale).

If, at block 420, the access server determines that the service is available remotely (e.g., in a cloud deployment), the method 400 continues to block 425, where the access server establishes a tunnel between the client device and the remote service. In an embodiment, this tunnel enables the client device to communicate directly with the remote service, enabling seamless access. In some embodiments, establishing the tunnel includes transmitting connection details to one or more other devices (such as the AP, the client device, the remote server, and the like) to establish the tunnel.

If, at block 420, the access server determines that the service is not available remotely either, the method 400 continues to block 430, where the access server returns an indication of failure. That is, the access server can indicate that the service cannot be provided because it is not available. Generally, this failure may be caused by a variety of factors. For example, connectivity to the relevant remote services may be interrupted, the services may be at capacity, and the like.

Figure 5:
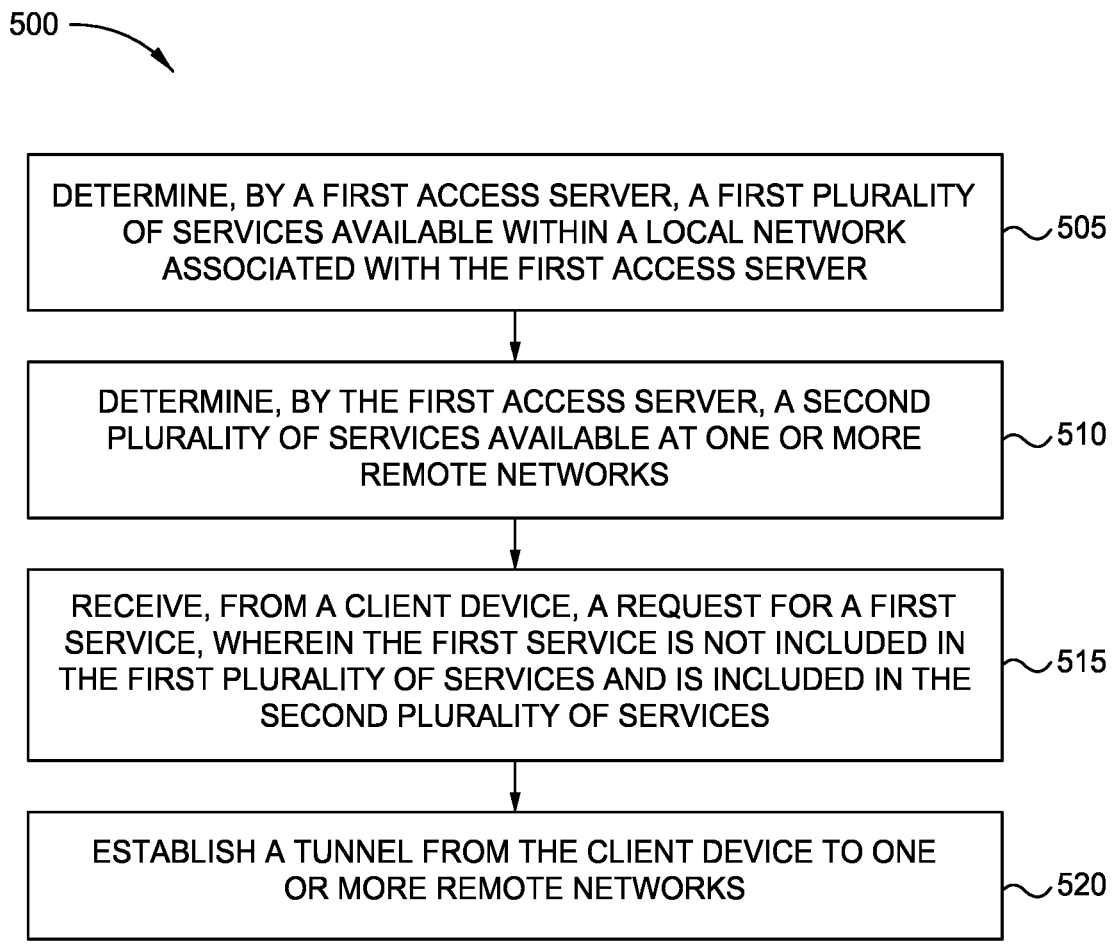
FIG. 5 is a flow diagram for providing a remote service, according to some embodiments disclosed herein.

FIG. 5 is a flow diagram depicting a method 500 for providing a remote service, according to some embodiments disclosed herein.

At block 505, a first plurality of services available within a local network associated with a first access server are determined. For example, the access server (e.g., local access server 115 in FIG. 1) may discover locally-available services (e.g., using discovery component 120 in FIG. 1).

At block 510, a second plurality of services available at one or more remote networks are determined. For example, the access server may discover remotely-available services (e.g., as depicted by service information 205A-N in FIG. 2).

At block 515, a request for a first service is received, from a client device, wherein the first service is not included in the first plurality of services and is included in the second plurality of services. This may correspond, for example, to the request 210 in FIG. 2.

At block 520, a tunnel is established from the client device to one or more remote networks. This may correspond, for example, to the tunnel 220 in FIG. 2D.

Figure 6:
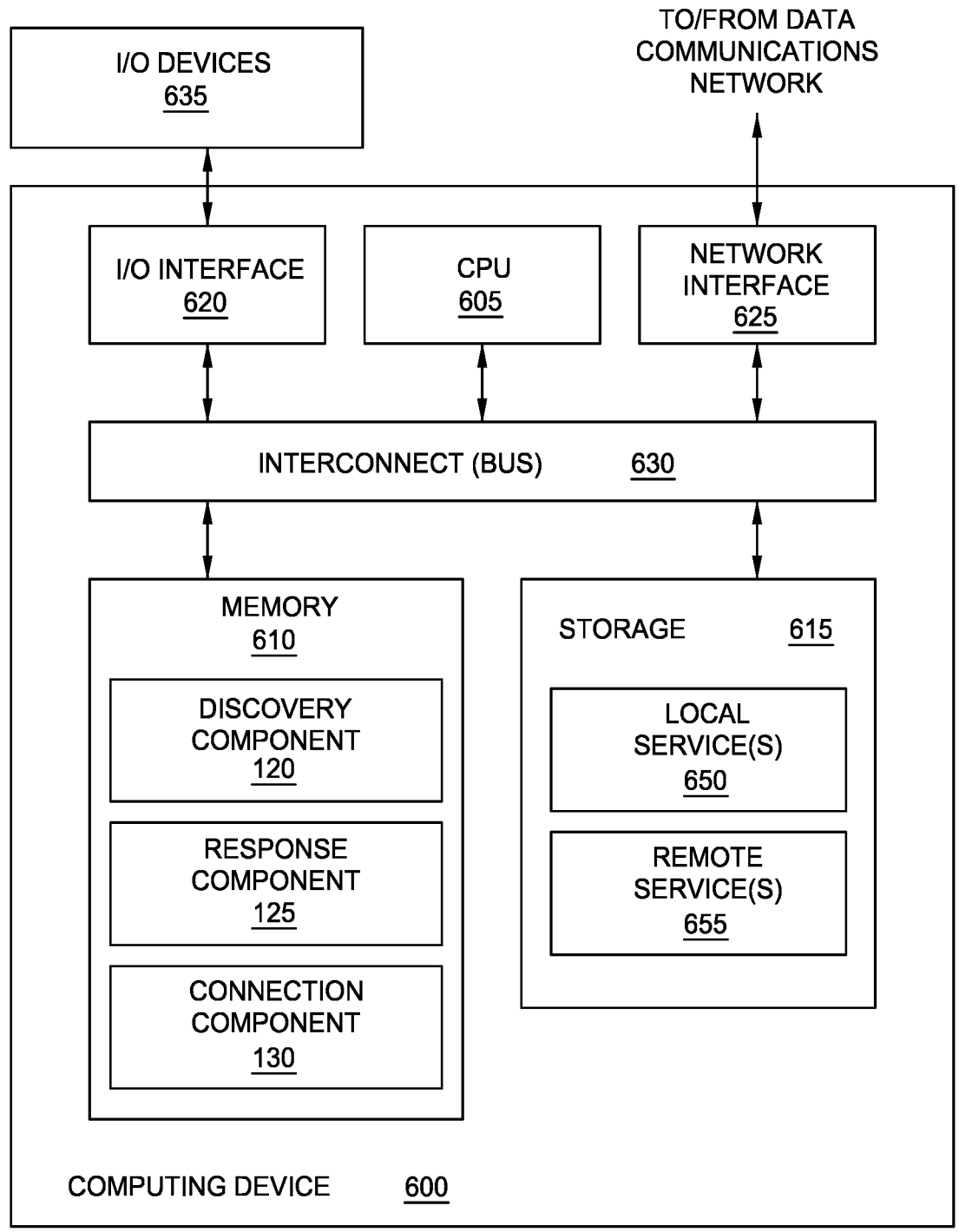
FIG. 6 is a block diagram depicting a computing device to provide federated service registries, according to some embodiments disclosed herein.

FIG. 6 is a block diagram depicting a computing device 600 to provide federated service registries, according to some embodiments disclosed herein.

Although depicted as a physical device, in embodiments, the computing device 600 may be implemented using virtual device(s), and/or across a number of devices (e.g., in a cloud environment). In one embodiment, the computing device 600 corresponds to the local access server 115 in FIG. 1. In another embodiment, the computing device 600 corresponds to the AP 110 in FIG. 1. In still another embodiment, the computing device 600 may correspond to a combination of the local access server 115 and the AP 110.

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a discovery component 120, response component 125, and connection component 130, each discussed above with reference to FIG. 1, which may perform one or more embodiments discussed above. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

Additionally, in the illustrated embodiment, the storage 615 includes indications of local services 650 and remote services 655. Generally, the local services 650 are those available within the local network, while remote services 655 are those that are available in remote locations (such as in the cloud). In an embodiment, the local services 650 and remote services 655 can include service information such as the particular location of each, connection details, costs, and the like. Although depicted as residing in storage 615, in some embodiments, the local services 650 and/or remote services 655 may be located in one or more other locations, such as in a federated SIR.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A or B" or "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining, by a first access server, a first plurality of services available within a local network associated with the first access server;
   determining, by the first access server, a second plurality of services available at one or more remote networks;
   transmitting, to a client device:
      an indication identifying each service of the first plurality of services, and
      an indication that additional services are available remotely without explicitly identifying services of the second plurality of services;
   receiving, from the client device, a request for a first service, wherein the first service is not included in the first plurality of services and is included in the second plurality of services; and
   establishing a tunnel from the client device to one or more remote networks.

2. The method of claim 1, wherein transmitting the indication identifying each service of the first plurality of services is performed in response to determining that a number of the first plurality of services does not exceed a threshold.

3. The method of claim 2, wherein transmitting the indication that additional services are available remotely is performed in response to determining that a number of the first plurality of services and the second plurality of services exceeds the threshold.

4. The method of claim 2, further comprising:
   in response to receiving, from the client device, a request for more information on the second plurality of services:
      transmitting, to the client device, an indication identifying each of the second plurality of services.

5. The method of claim 1, wherein determining the second plurality of services available at one or more remote networks comprises:
   determining a category of the first service;
   identifying one or more remote networks that specify the category as available; and
   querying at least one of the one or more remote networks to determine whether the first service is available.

6. The method of claim 1, wherein the tunnel enables the client device to access the first service on a first remote network via a second access server associated with the first remote network.

7. The method of claim 1, wherein determining the second plurality of services available at one or more remote networks further comprises determining, for each respective service of the second plurality of services, respective connection details.

8. The method of claim 7, wherein the respective connection details comprise a manner of connecting to the respective service and a cost of the respective service.

9. A computer product comprising logic encoded in a non-transitory medium, the logic executable by operation of one or more computer processors to perform an operation comprising:
   determining, by a first access server, a first plurality of services available within a local network associated with the first access server;
   determining, by the first access server, a second plurality of services available at one or more remote networks;
   transmitting, to a client device:
      an indication identifying each service of the first plurality of services, and
      an indication that additional services are available remotely without explicitly identifying services of the second plurality of services;
   receiving, from the client device, a request for a first service, wherein the first service is not included in the first plurality of services and is included in the second plurality of services; and
   establishing a tunnel from the client device to one or more remote networks.

10. The computer product of claim 9, wherein:
    transmitting the indication identifying each service of the first plurality of services is performed in response to determining that a number of the first plurality of services does not exceed a threshold; and transmitting the indication that additional services are available remotely is performed in response to determining that a number of the first plurality of services and the second plurality of services exceeds the threshold.

11. The computer product of claim 9, wherein transmitting the indication identifying each service of the first plurality of services is performed in response to determining that a number of the first plurality of services does not exceed a threshold, the operation further comprising:

in response to receiving, from the client device, a request for more information on the second plurality of services:

transmitting, to the client device, an indication identifying each of the second plurality of services.

12. The computer product of claim 9, wherein determining the second plurality of services available at one or more remote networks comprises:

determining a category of the first service;

identifying one or more remote networks that specify the category as available; and querying at least one of the one or more remote networks to determine whether the first service is available.

13. The computer product of claim 9, wherein the tunnel enables the client device to access the first service on a first remote network via a second access server associated with the first remote network.

14. The computer product of claim 9, wherein determining the second plurality of services available at one or more remote networks further comprises determining, for each respective service of the second plurality of services, respective connection details.

15. A system comprising:

one or more computer processors; and logic encoded in a non-transitory medium, the logic executable by operation of the one or more computer processors to perform an operation comprising:

determining, by a first access server, a first plurality of services available within a local network associated with the first access server;

determining, by the first access server, a second plurality of services available at one or more remote networks;

transmitting, to a client device:

an indication identifying each service of the first plurality of services, and an indication that additional services are available remotely without explicitly identifying services of the second plurality of services;

receiving, from the client device, a request for a first service, wherein the first service is not included in the first plurality of services and is included in the second plurality of services; and establishing a tunnel from the client device to one or more remote networks.

16. The system of claim 15, wherein:

transmitting the indication identifying each service of the first plurality of services is performed in response to determining that a number of the first plurality of services does not exceed a threshold; and transmitting the indication that additional services are available remotely is performed in response to determining that a number of the first plurality of services and the second plurality of services exceeds the threshold.

17. The system of claim 15, wherein transmitting the indication identifying each service of the first plurality of services is performed in response to determining that a number of the first plurality of services does not exceed a threshold, the operation further comprising:

in response to receiving, from the client device, a request for more information on the second plurality of services:

transmitting, to the client device, an indication identifying each of the second plurality of services.

18. The system of claim 15, wherein determining the second plurality of services available at one or more remote networks comprises:

determining a category of the first service;

identifying one or more remote networks that specify the category as available; and querying at least one of the one or more remote networks to determine whether the first service is available.

19. The system of claim 15, wherein the tunnel enables the client device to access the first service on a first remote network via a second access server associated with the first remote network.

20. The system of claim 15, wherein determining the second plurality of services available at one or more remote networks further comprises determining, for each respective service of the second plurality of services, respective connection details.

* * * * *